United States Patent
Hu et al.

(10) Patent No.: US 11,968,032 B2
(45) Date of Patent: Apr. 23, 2024

(54) INITIAL ACCESS PROCEDURE AND INITIAL BWP CONFIGURATION FOR BANDWIDTH LIMITED UE DEVICE

(71) Applicant: Samsung Electronics Co., Ltd., Suwon-si (KR)

(72) Inventors: Liang Hu, San Diego, CA (US); Jung Hyun Bae, San Diego, CA (US); Jungmin Park, Seoul (KR); Hsien-Ping Lin, San Diego, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 316 days.

(21) Appl. No.: 17/234,761

(22) Filed: Apr. 19, 2021

(65) Prior Publication Data

US 2021/0328700 A1    Oct. 21, 2021

Related U.S. Application Data

(60) Provisional application No. 63/037,531, filed on Jun. 10, 2020, provisional application No. 63/013,391, filed on Apr. 21, 2020.

(51) Int. Cl.
*H04J 11/00*     (2006.01)
*H04W 72/23*    (2023.01)

(52) U.S. Cl.
CPC ......... *H04J 11/0073* (2013.01); *H04W 72/23* (2023.01)

(58) Field of Classification Search
CPC .............. H04J 11/0073; H04J 11/0076; H04J 11/0069; H04W 72/23; H04W 48/16; H04W 72/0453; H04W 72/51; H04W 48/12; H04W 48/10; H04W 72/02; H04L 41/0896

See application file for complete search history.

(56) References Cited

U.S. PATENT DOCUMENTS

| | | | |
|---|---|---|---|
| 10,492,157 B2 | 11/2019 | Nam et al. | |
| 2019/0254073 A1* | 8/2019 | Sheng | H04W 72/23 |
| 2020/0084705 A1 | 3/2020 | Xu et al. | |
| 2020/0137741 A1 | 4/2020 | Zhou et al. | |
| 2020/0228966 A1* | 7/2020 | Xu | H04W 56/001 |

(Continued)

FOREIGN PATENT DOCUMENTS

| | | | | |
|---|---|---|---|---|
| CN | 110603877 A | * | 12/2019 | ........... H04B 7/0452 |
| WO | WO-2020149978 A1 | * | 7/2020 | ........... H04L 5/0053 |

(Continued)

OTHER PUBLICATIONS

Unpublished U.S. Appl. No. 17/234,754, filed Apr. 19, 2021.

*Primary Examiner* — Ayaz R Sheikh
*Assistant Examiner* — Tarell A Hampton
(74) *Attorney, Agent, or Firm* — Lewis Roca Rothgerber Christie LLP

(57) ABSTRACT

A system and method for accommodating reduced capability user equipment in a mobile network. The method may include a method for accommodating bandwidth-limited UEs in the initial access process, employing an extended System Information Block #1, or employing, for bandwidth-limited UEs, a separate Synchronization Signal Block, a separate initial Control Resource Set, and a separate Radio Resource Control System Information Block #1.

21 Claims, 8 Drawing Sheets

(56) References Cited

U.S. PATENT DOCUMENTS

| | | | |
|---|---|---|---|
| 2020/0252916 A1 | 8/2020 | Abdoli et al. | |
| 2020/0305179 A1 | 9/2020 | Li | |
| 2020/0344097 A1 | 10/2020 | Si et al. | |
| 2020/0344761 A1 | 10/2020 | Amuru et al. | |
| 2020/0404600 A1* | 12/2020 | Ly | H04L 1/1614 |
| 2020/0404601 A1 | 12/2020 | Lin et al. | |
| 2021/0007085 A1 | 1/2021 | Lin et al. | |
| 2021/0037439 A1* | 2/2021 | Harada | H04W 56/0015 |
| 2021/0195579 A1* | 6/2021 | Lei | H04L 5/0053 |
| 2021/0235441 A1* | 7/2021 | Wang | H04W 72/51 |
| 2021/0250929 A1* | 8/2021 | Sakhnini | H04W 48/12 |
| 2021/0250930 A1* | 8/2021 | Sakhnini | H04L 5/0053 |
| 2021/0274562 A1* | 9/2021 | Takeda | H04W 74/002 |
| 2021/0329574 A1* | 10/2021 | Ang | H04L 5/0037 |
| 2022/0271894 A1* | 8/2022 | Li | H04W 72/23 |
| 2022/0353807 A1* | 11/2022 | He | H04W 48/20 |
| 2022/0377705 A1* | 11/2022 | Wang | H04L 5/0091 |
| 2022/0408479 A1* | 12/2022 | Wang | H04W 74/006 |
| 2023/0007524 A1* | 1/2023 | Wang | H04L 5/0094 |
| 2023/0007603 A1* | 1/2023 | Sui | H04W 72/0453 |

FOREIGN PATENT DOCUMENTS

| | | | | |
|---|---|---|---|---|
| WO | WO-2020190205 A1 * | 9/2020 | | H04L 1/0061 |
| WO | WO-2021112740 A1 * | 6/2021 | | H04W 72/044 |
| WO | WO-2021163857 A1 * | 8/2021 | | H04L 5/0053 |
| WO | WO-2021199356 A1 * | 10/2021 | | |
| WO | WO-2021199357 A1 * | 10/2021 | | |
| WO | WO-2021201757 A1 * | 10/2021 | | |

* cited by examiner

| Step | Stage | DL BWP | UL BWP | Processing |
|---|---|---|---|---|
| 0 | PSS and SSS Decode | | | DL Synchronization |
| 1 | MIB decode | | | UE decode MIB and get CORESET #0 configuration |
| 2 | RMSI decode | CORESET #0 | | Get Initial DL-BWP and Initial UL-BWP setting for RMSI decoding |
| 3 | Msg-1-UE >——> gNB | | Initial UL-BWP | Random Access Request to gNB |
| 4 | Msg-2-UE <——< gNB | CORESET #0 | | Random Access Response (RAR) gNB |
| 5 | Msg-3-UE >——> gNB | | Initial UL-BWP | RRC connection request |
| 6 | Msg-4-UE <——< gNB | CORESET #0 | | RRC connection setup Configure UE specific BWP (default/1st active/other) BWP If not configured, still use initial BWP |
| 7 | Msg-5-UE >——> gNB | 1st Active BWP | 1st Active BWP | RRC set-up completed Initial BWP is the 1st Active BWP if no additional configuration carried in Msg4 |

FIG. 3A

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 24 | 2 | 0 |
| 1 | 1 | 24 | 2 | 2 |
| 2 | 1 | 24 | 2 | 4 |
| 3 | 1 | 24 | 3 | 0 |
| 4 | 1 | 24 | 3 | 2 |
| 5 | 1 | 24 | 3 | 4 |
| 6 | 1 | 48 | 1 | 12 |
| 7 | 1 | 48 | 1 | 16 |
| 8 | 1 | 48 | 2 | 12 |
| 9 | 1 | 48 | 2 | 16 |
| 10 | 1 | 48 | 3 | 12 |
| 11 | 1 | 48 | 3 | 16 |
| 12 | 1 | 96 | 1 | 38 |
| 13 | 1 | 96 | 2 | 38 |
| 14 | 1 | 96 | 3 | 38 |
| 15 | Reserved | | | |

FIG. 3B

INITIAL ACCESS PROCEDURE AND INITIAL BWP CONFIGURATION FOR BANDWIDTH LIMITED UE DEVICE

CROSS-REFERENCE TO RELATED APPLICATION(S)

The present application claims priority to and the benefit of (i) U.S. Provisional Application No. 63/013,391, filed Apr. 21, 2020, entitled "INITIAL ACCESS PROCEDURE AND INITIAL BWP CONFIGURATION FOR BANDWIDTH LIMITED NR DEVICE", and of (ii) U.S. Provisional Application No. 63/037,531, filed Jun. 10, 2020, entitled "INITIAL ACCESS PROCEDURE AND INITIAL BWP CONFIGURATION FOR BANDWIDTH LIMITED NR DEVICE"; both of the applications identified in this paragraph are incorporated herein by reference.

FIELD

One or more aspects of embodiments according to the present disclosure relate to mobile communications, and more particularly to a system and method for accommodating reduced capability user equipment in a mobile communications network.

BACKGROUND

In mobile communications networks, useful applications may exist for user equipment that is small, or low-cost, or that consumes little power. Such user equipment may be more readily produced by reducing its capabilities compared to other user equipment. Unless accommodations are made for such reduced capabilities, however, the reduction in capabilities may in some circumstances result in a failure to establish a connection between the network and the user equipment.

Thus, there is a need for a system and method for accommodating reduced capability user equipment in a mobile network.

SUMMARY

According to an embodiment of the present disclosure, there is provided a method, including: acquiring, by a bandwidth-limited user equipment (UE) having a bandwidth capability, a Synchronization Signal Block (SSB) including a Master Information Block (MIB); determining a set of identifying bits; identifying a first initial control resource set (CORESET), based on the set of identifying bits; and monitoring, by the bandwidth-limited UE, the first initial CORESET.

In some embodiments, the identifying of the first initial CORESET includes: detecting, by the bandwidth-limited UE, a reserved bit in the MIB; and identifying the first initial CORESET from among a set of bandwidth-limited initial CORESETs, based on the set of identifying bits, wherein the MIB contains the set of identifying bits.

In some embodiments, the determining of the set of identifying bits includes: detecting, by the bandwidth-limited UE, a reserved bit in the MIB; and acquiring, by the bandwidth-limited UE, an extended MIB (e-MIB) containing the set of identifying bits.

In some embodiments, the identifying of the first initial CORESET includes: identifying a legacy initial CORESET from a full-bandwidth set of initial CORESETs; determining that the bandwidth of the legacy initial CORESET is within the bandwidth capability of the bandwidth-limited UE; and identifying the first initial CORESET to be the legacy initial CORESET.

In some embodiments, the identifying of the first initial CORESET includes: identifying a legacy initial CORESET from a full-bandwidth set of initial CORESETs; determining that the bandwidth of the legacy initial CORESET is not within the bandwidth capability of the bandwidth-limited UE; and identifying the first initial CORESET from a set of bandwidth-limited initial CORESETs, based on set of identifying bits.

In some embodiments, the method includes monitoring the first initial CORESET for a Downlink Control Information (DCI).

In some embodiments, the DCI includes a cyclic redundancy code (CRC) scrambled with a bandwidth-limited System Information Radio Network Temporary Identifier (SI-BL-RNTI).

In some embodiments, the method further includes acquiring a bandwidth-limited System Information Block #1 (SIB1) through a scheduled Physical Downlink Shared Channel (PDSCH).

In some embodiments, the method further includes acquiring, by a full-bandwidth (UE), the Synchronization Signal Block (SSB), determining the set of identifying bits; identifying a second initial control resource set (CORESET), based on the set of identifying bits; and monitoring, by the full-bandwidth UE, the second initial CORESET.

According to an embodiment of the present disclosure, there is provided a method, including: acquiring, by a bandwidth-limited user equipment (UE) having a bandwidth capability, a synchronization signal block including a master information block (MIB); determining a set of identifying bits; identifying an initial control resource set (CORESET), based on the set of identifying bits, the initial CORESET occupying a bandwidth greater than the bandwidth capability of the bandwidth-limited UE; and selecting, by the bandwidth-limited UE, a portion of the initial CORESET, the portion of the initial CORESET occupying a bandwidth within the bandwidth capability of the bandwidth-limited UE.

In some embodiments, the method further includes acquiring a first Downlink Control Information (DCI) through a punctured Physical Downlink Control Channel (PDCCH).

In some embodiments, the method further includes acquiring a System Information Block #1 (SIB1) and an extended System Information Block #1 (e-SIB1) through a scheduled Physical Downlink Shared Channel (PDSCH), wherein the PDSCH occupies a bandwidth greater than the bandwidth capability of the bandwidth-limited UE, and the acquiring of the SIB1 and of the e-SIB1 includes acquiring the SIB1 and of the e-SIB1 through a punctured PDSCH.

In some embodiments, the method further includes: determining, from the e-SIB1, by the bandwidth-limited UE: an uplink bandwidth part (BWP), and a downlink BWP; transmitting, by the bandwidth-limited UE, in the uplink BWP; and receiving, by the bandwidth-limited UE, a network communication in the downlink BWP.

In some embodiments, the selecting, by the bandwidth-limited UE, of a portion of the initial CORESET includes implicitly selecting, by the bandwidth-limited UE, a portion of the initial CORESET.

According to an embodiment of the present disclosure, there is provided a method, including acquiring, by a bandwidth-limited user equipment (UE), a bandwidth-limited Synchronization Signal Block (BL-SSB).

In some embodiments, the method further includes acquiring, by a full-bandwidth user equipment (UE), a Synchronization Signal Block (SSB) different from the BL-SSB, wherein the SSB is received in a first set of resource elements (REs) and the BL-SSB is received in a second set of resource elements, different from the first set of resource elements (REs).

In some embodiments, the method further includes: acquiring, by the bandwidth-limited UE, a bandwidth-limited Master Information Block (BL-MIB) from a bandwidth-limited physical broadcast channel (BL-PBCH) from the BL-SSB; and acquiring, by the bandwidth-limited UE, a bandwidth-limited initial control resource set (CORESET) from the BL-MIB.

In some embodiments, the method further includes acquiring, by the bandwidth-limited UE, a Downlink Control Information (DCI), the acquiring of the DCI including monitoring the bandwidth-limited initial CORESET for a DCI including a cyclic redundancy code (CRC) scrambled with a bandwidth-limited System Information Radio Network Temporary Identifier (SI-BL-RNTI).

In some embodiments, the method further includes acquiring, by the bandwidth-limited UE, a bandwidth-limited System Information Block #1 (SIB1) through a scheduled Physical Downlink Shared Channel (PDSCH).

In some embodiments, the acquiring, by the bandwidth-limited user equipment (UE), of the BL-SSB includes acquiring the BL-SSB in Frequency Range 1 (FR1).

In some embodiments, the acquiring, by the bandwidth-limited user equipment (UE), of the BL-SSB includes acquiring the BL-SSB in Frequency Range 2 (FR2).

BRIEF DESCRIPTION OF THE DRAWINGS

These and other features and advantages of the present disclosure will be appreciated and understood with reference to the specification, claims, and appended drawings wherein:

FIG. 3A is a table of bandwidth part configurations, according to an embodiment of the present disclosure;

FIG. 3B is a table of resource blocks and slot symbols, according to an embodiment of the present disclosure;

DETAILED DESCRIPTION

Figure 1:
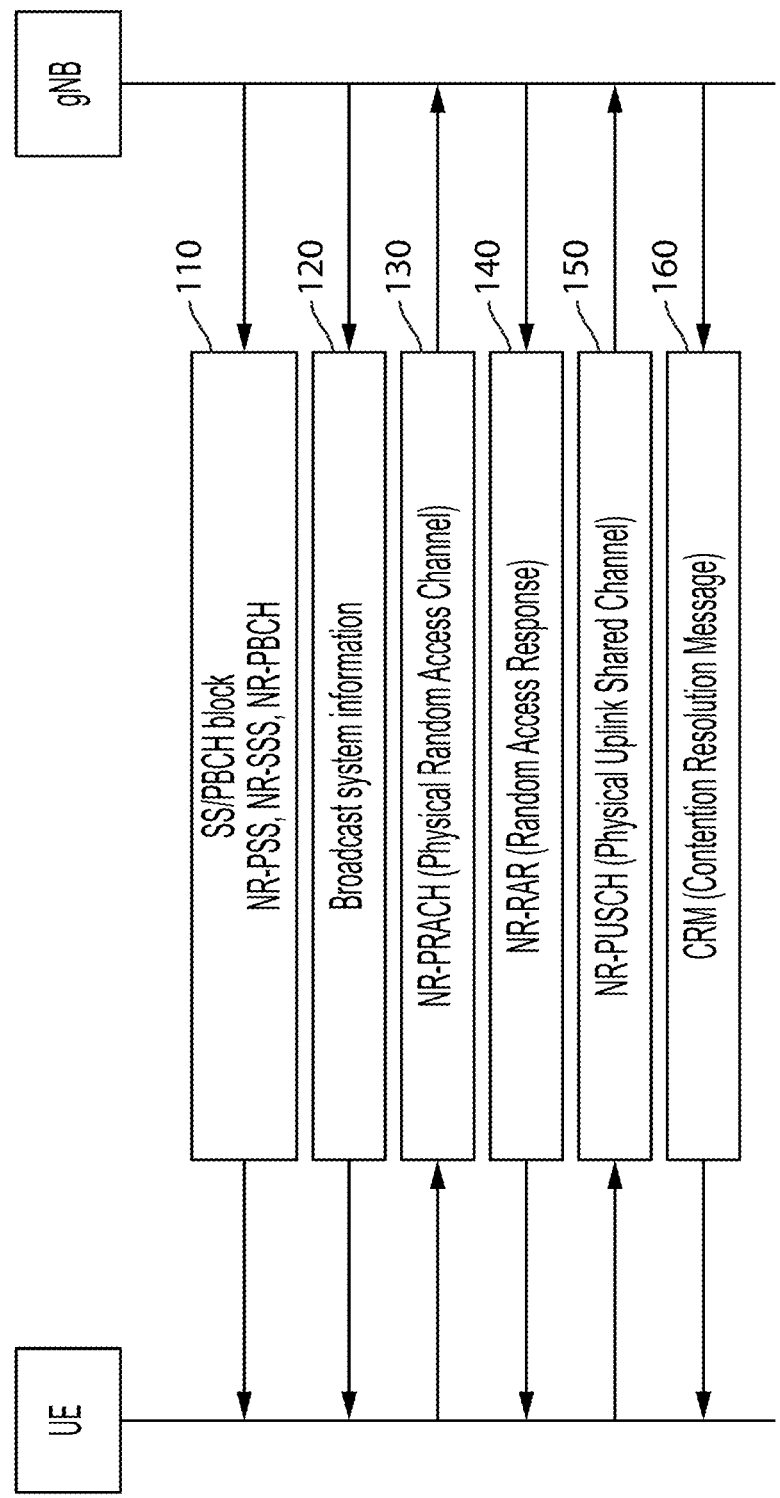
FIG. 1 is an illustration of an initial access procedure, according to an embodiment of the present disclosure.

The detailed description set forth below in connection with the appended drawings is intended as a description of exemplary embodiments of a system and method for accommodating reduced capability user equipment in a mobile network provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

In the 3rd Generation Partnership Project (3GPP) Release 17 (Rel-17) of the standard for the 5th generation mobile network (5G), in a Study Item (SID) on Reduced Capability NR devices, one of the objectives is to identify and study potential UE complexity reduction features such as User Equipment (UE) bandwidth reduction. With the introduction of bandwidth (BW) limited (BL) UEs, there may be specification impact on the UE initial access procedure, since bandwidth-limited UEs, which have lower bandwidth capability than legacy bandwidth requirements on UEs, may not be able to perform a legacy initial access procedure.

As used herein (except in the phrase "legacy initial CORESET"), "legacy" refers to a system lacking special provisions for accommodating bandwidth-limited UEs, or to an element of such a system (e.g., a legacy CORESET #0 or a legacy Physical Broadcast Channel (PBCH)). As used herein, certain phrases, such as "user equipment" and "downlink control information" are used as countable nouns even though the nouns they contain (e.g., "equipment" and "information") may not be countable in ordinary English. As used herein, a "bandwidth-limited UE" is a UE having bandwidth capabilities not sufficient to meet legacy bandwidth requirements on UEs. When applied to a term other than a UE, the qualifier "bandwidth-limited" means, related to a bandwidth-limited UE. It may or may not mean that the qualified term itself has (e.g., occupies) limited bandwidth. For example, a "bandwidth-limited initial CORESET" may have limited bandwidth, but a "bandwidth-limited SI-RNTI" (or SI-BL-RNTI, discussed below) need not occupy a limited bandwidth.

As an example of such specification impact, in 3GPP Release 15 (Rel-15), the legacy initial control resource set (CORESET #0) may have a maximum bandwidth of 17 MHz (assuming a 15 kHz subcarrier spacing (SCS) and 96 Physical Resource Blocks (PRBs) (each including 12 subcarriers)), which may be larger than the maximum bandwidth (e.g., 5 MHz or 10 MHz) targeted for low tier bandwidth-limited UEs. In this case, the bandwidth-limited UEs may not be able to acquire the legacy System Information Block #1 (SIB1) information via the legacy CORESET #0, and may therefore be unable to perform the initial access procedure. Moreover, the initial uplink bandwidth part (BWP) for bandwidth-limited UEs may be different than the legacy initial uplink BWP, due to the lower bandwidth capability of bandwidth-limited UEs. It may therefore be advantageous to provide mechanisms in the network and in the bandwidth-limited UEs to enable the bandwidth-limited UEs to use the reduced initial uplink BWP for uplink transmission.

The legacy initial access procedure in NR is illustrated in FIG. 1. As shown in FIG. 1, it may include (e.g., consist of) the following steps: at 110, the network base station (gNB) periodically transmits Synchronization Signal (SS) blocks (SSBs) carrying synchronization signals (including primary synchronization signals PSSs, and secondary synchronization signals (SSSs)) and Physical Broadcast Channels (PBCHs) using beam sweeping. One SS block contains one PSS symbol, one SSS symbol, and two PBCH symbols. A Synchronization Signal burst may carry one or multiple SS blocks. The combination of PSS and SSS may help to identify about 1008 physical cell identities. Each UE performs beam measurements and determines the best beam during synchronization.

Subsequently, at 120, the gNB transmits, and the UE receives and decodes, 5G New Radio (NR) system information viz. a Master Information Block (MIB) and a System Information Block (SIB) on that beam. Minimum SI (System Information) is carried on the Physical Broadcast Channel. The rest of the Remaining Minimum System Information (RMSI) and the SIB1 is carried on the Physical Downlink Shared Channel (PDSCH). The numerology used for the RMSI is indicated in the PBCH payload. CORESET #0 is dedicated for RMSI scheduling. CORESET #0 is not confined within PBCH Bandwidth. There is an RMSI Physical Downlink Control Channel (PDCCH) monitoring window associated with the SS/PBCH block, which recurs periodically. Other System Information (OSI) contains on-demand system information delivery. OSI is carried on the PDSCH using the same numerology as is used for the RMSI. At 130, the UE uses the same beam and attempts random access by transmitting a Random Access Channel (RACH) preamble (i.e., message 1, or "Message #1") on the configured RACH resource. The gNB responds with a Random Access Response RAR ("RA Response") message, which is message 2, or "Message #2". The UE then transmits, at 150, message 3, or "Message #3" (i.e., a Radio Resource Control (RRC) Connection Request) in the PUSCH (e.g., NR-PUSCH) channel. The gNB then responds, at 160, with message 4, or "Message #4" (i.e., RRC Connection Setup) which is the contention resolution message and which completes the initial access process.

Figure 2:
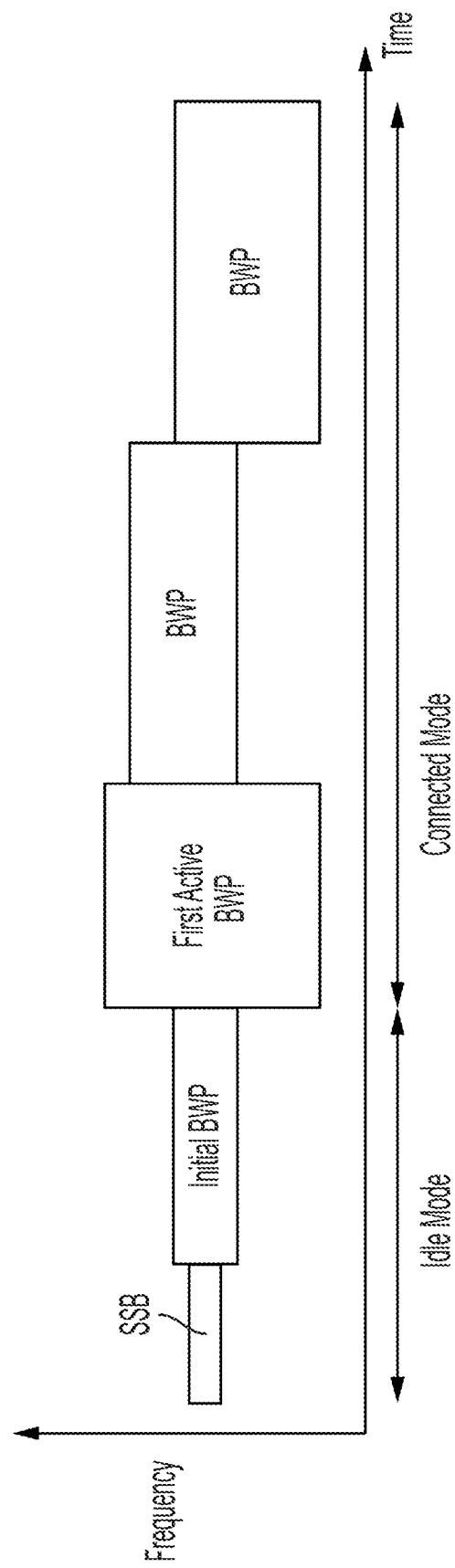
FIG. 2 is an illustration of a sequence of bandwidth parts, according to an embodiment of the present disclosure.

FIG. 2 shows the different BWP types available for a UE in different RRC states. In some use cases, the Idle Mode BWP may be smaller than Connected Mode BWPs. Three types of BWP are available: Initial BWP, Active BWP (UE Specific), and Default BWP (UE Specific). The Initial BWP is used to perform the Initial Access procedure. It includes Parameters like RMSI (Requested Minimum System Information), CORESET #0 and RMSI frequency location, bandwidth, and SCS. It can be between 24 and 96 PRBs with different settings and it may be relaxed to a wider BWP after RMSI decoding. The Active BWP is defined as UE specific. It is the first BWP within which the UE starts data transfer after RRC configuration or reconfiguration. The very first Active BWP may be different from the default BWP.

The table of FIG. 3A shows the BWP configurations at different stages of the initial access process; both uplink and downlink BWPs are considered. The BWP configuration is split into uplink and downlink parameters as well as into common and dedicated parameters. Common parameters (in BWP-UplinkCommon and BWP-DownlinkCommon) may be "cell specific" and the network may ensure the necessary alignment with corresponding parameters of other UEs. The common parameters of the initial BWP of the PCell are also provided via system information. For all other serving cells, the network may provide the common parameters via dedicated signaling.

The CORESET #0 configurations are pre-defined in a set of tables, and the index of the table to be used is contained in the MIB message. The table of FIG. 3B shows one example of a set of resource blocks and slot symbols of a CORESET #0 configuration when [SS/PBCH block, PDCCH] SCS is [15,15] kHz (i.e., the SCS of SS/PBCH block and PDCCH are 15 kHz and 15 kHz respectively) for frequency bands with minimum channel bandwidth 5 and 10 MHz. The initial CORESET may be the one for SIB1/PDCCHType0.

Figure 4A:
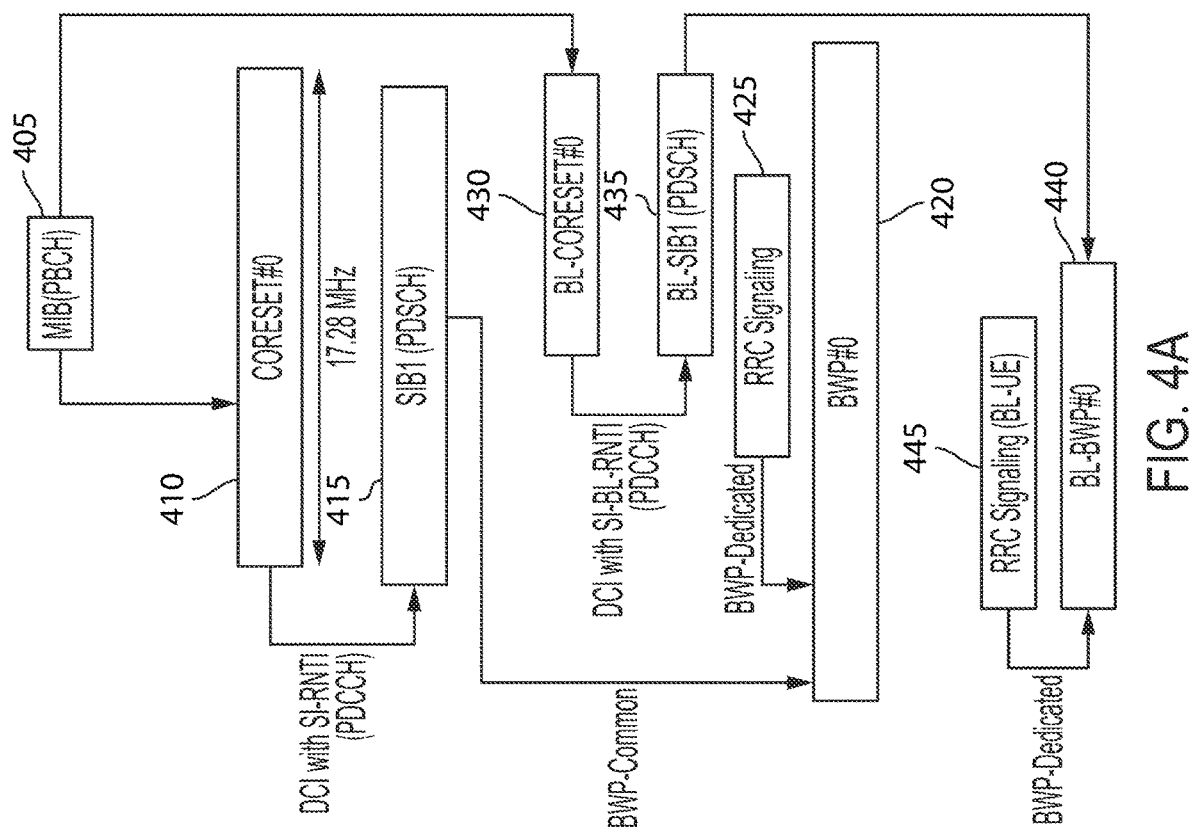
FIG. 4A is an illustration of an initial access process, according to an embodiment of the present disclosure.
Figure 4B:
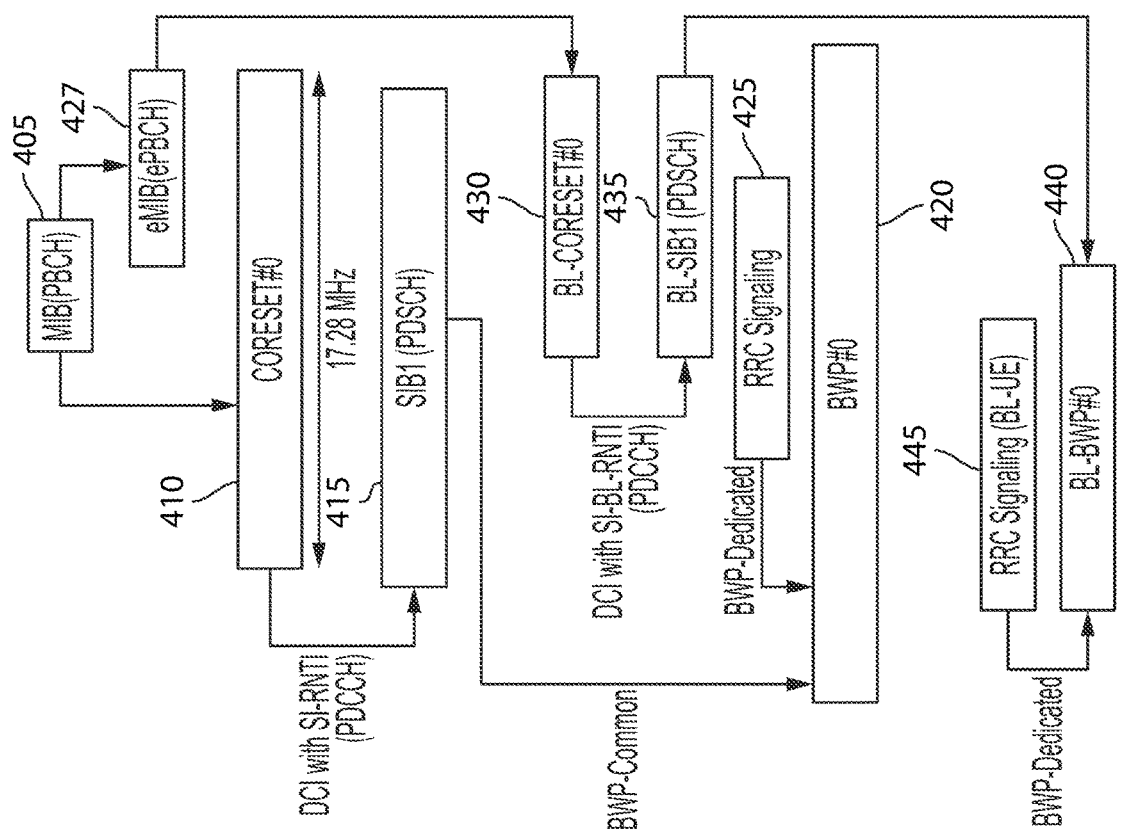
FIG. 4B is an illustration of an initial access process, according to an embodiment of the present disclosure.

In some embodiments, the accommodating of bandwidth-limited UEs in the initial access process may be accomplished by various methods, identified herein as Embodiment 1, Embodiment 2, and Embodiment 3, with various options possible for Embodiment 1. These embodiments are described herein, for ease of explanation, in the context of a full-bandwidth UE and a bandwidth-limited UE, both of which are performing the initial access process. In operation, many full-bandwidth UEs and many bandwidth-limited UEs may be interacting with the gNB at any time. FIGS. 4A and 4B illustrate Embodiment 1, which may also be referred to as "eMIB+BL-CORESET #0+RRC BL-SIB1".

Referring to FIG. 4A, both the legacy UE or "full-bandwidth UE" and the bandwidth-limited UE acquire the SSB at 405 and decode the MIB. Depending on which option is implemented, an extended MIB, referred to herein as an e-MIB, may also be transmitted by the gNB, and, when present, decoded by the bandwidth-limited UE, and, optionally, by the full-bandwidth UE.

In one configuration, which may be referred to as Option 1, when the bandwidth-limited UE detects a reserved bit in the MIB (employed in Option 1 for the purpose of supporting bandwidth-limited UEs), the bandwidth-limited UE interprets the MIB information bits (which may be referred herein to as "identifying bits") in the PBCH differently than the full-bandwidth UE. For example, the full-bandwidth UE may use the identifying bits to identify the initial CORESET (CORESET #0) from among a full-bandwidth set of configuration tables, and the bandwidth-limited UE may use the identifying bits to identify the initial CORESET (which may be referred to as BL-CORESET #0) from among a different set of configuration tables, which includes only bandwidth-limited initial CORESETs. As used herein, a set of bandwidth-limited configuration tables is a set of tables (that may be specifically designed for bandwidth-limited UEs) including a set of candidate bandwidth-limited initial CORESETs, each of which occupies no more bandwidth than the bandwidth capability of the bandwidth-limited UE. In each case (e.g., both for the full-bandwidth UE and for the bandwidth-limited UE) the identifying bits may identify the initial CORESET to be used by, e.g., pointing (directly or indirectly) to the initial CORESET to be used, e.g., the identifying bits may be an index into an array of pointers, each of which points to an initial CORESET in the set of configuration tables. As used herein, "initial CORESET" means CORESET #0. When the Option 1 configuration is employed, an e-MIB may not be needed and may be absent.

As used herein, a full-bandwidth set of configuration tables is a set of tables including a full-bandwidth set of initial CORESETs, which is a set of initial CORESETs at least one of which occupies more bandwidth than the bandwidth capability of the bandwidth-limited UE. As used herein, a set of bandwidth-limited initial CORESETs is a set of initial CORESETs none of which occupies more bandwidth than the bandwidth capability of the bandwidth-limited UE.

In another configuration, which may be referred to as Option 2 and which is illustrated in FIG. 4B, the bandwidth-limited UE acquires, at 427, in addition to acquiring the legacy PBCH, an e-MIB in an extended PBCH (ePBCH) located in physical resources pre-defined to be available for this purpose. The e-MIB, which may be employed by the bandwidth-limited UE to identify the CORESET #0, may contain (in an information element (IE) in the e-MIB) identifying bits for identifying a bandwidth-limited initial CORESET, and the MIB, may, as in a legacy system, contain identifying bits for identifying an initial CORESET for use in a full-bandwidth UE (i.e., an initial CORESET that may be, but need not be, bandwidth-limited).

In another configuration, which may be referred to as Option 3, the full-bandwidth UE may identify the initial CORESET as it would in a legacy system. The bandwidth-limited UE may identify a legacy initial CORESET by interpreting the identifying bits as identifying an initial CORESET within the legacy (full-bandwidth) configuration tables. If the legacy initial CORESET occupies no more bandwidth than the bandwidth capability of the bandwidth-limited UE, then the bandwidth-limited UE may use it, i.e., the bandwidth-limited UE may identify the initial CORESET to be the legacy initial CORESET. Otherwise (i.e., if the legacy initial CORESET occupies more bandwidth than the bandwidth capability of the bandwidth-limited UE), the bandwidth-limited UE may interpret the identifying bits as identifying an initial CORESET within the bandwidth-limited configuration tables. Option 3 may not use a reserved bit in the legacy MIB, and may therefore be a feasible implementation even in circumstances in which all of the reserved bits of the legacy MIB are allocated to other functions. In case of option 3, the presence of BL-CORESET which is detected by bandwidth limited UE indicates the network can support bandwidth-limited UEs.

The full-bandwidth UE may, at 410, monitor CORESET #0 for a downlink control element (DCI) with a CRC scrambled by a System Information Radio Network Temporary Identifier (SI-RNTI), and, at 415, it may receive and decode a SIB1 through a scheduled Physical Downlink Shared Channel (PDSCH), based on the DCI, and from the SIB1 it may obtain the initial BWP configuration (BWP #0) for both uplink and downlink. The full-bandwidth UE may then, at 420, switch to BWP #0, based on SIB1, and receive and decode RRC signaling at 425, where the full bandwidth UE can be configured with a UE-specific dedicated BWP (other than initial BWP).

The bandwidth-limited UE may proceed in an analogous manner, while operating within its bandwidth constraints. At 430, it may monitor BL-CORESET #0 for a downlink control element (DCI) with a CRC scrambled by a bandwidth-limited SI-RNTI (SI-BL-RNTI). At 435, it may receive and decode a BL-SIB1 through a scheduled PDSCH, based on the DCI, and from the BL-SIB1 it may obtain the initial BWP configuration (BL-BWP #0) for both uplink and downlink. The bandwidth-limited UE may then, at 440, switch to BL-BWP #0 (a bandwidth part that is within its capabilities), based on BL-SIB1, and receive and decode RRC signaling at 445, where the BL-UE can be configured with a UE-specific dedicated BWP (other than initial BWP).

In Embodiment 1, the ePBCH of Option 2 may (i) have a fixed time and frequency relationship to the legacy SSB frequency and time position, or it may (ii) have a fixed frequency and time resource relationship to the CORESET #0 resource position.

Embodiment 1 may carry some costs, e.g., (i) it may occupy additional PDCCH and PDSCH resources for scheduling and transmitting of the BL-SIB1, (ii) in case of Option 2, it may also occupy additional resources for ePBCH, (iii) it may duplicate a number of SIB1 IE's in the BL-SIB1, and (iv) (except in Option 3) it may consume the reserved bit in the MIB. Embodiment 1 may also carry various advantages. It may be capable of supporting all CORESET #0 configurations for Rel-15 legacy UEs, and also provide full flexibility to configure BL-CORSET #0.

Figure 5:
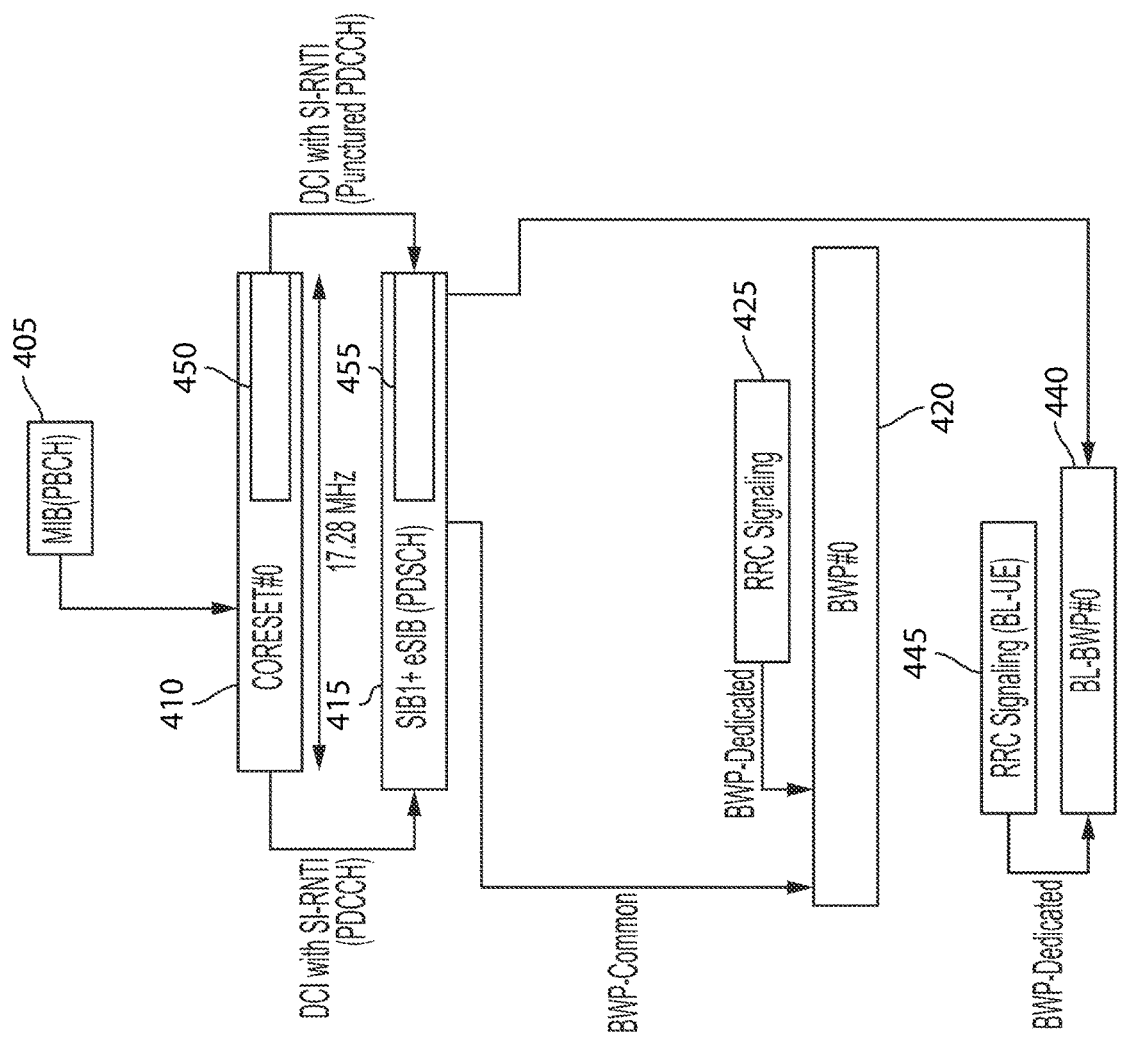
FIG. 5 is an illustration of an initial access process, according to an embodiment of the present disclosure.

In another embodiment, referred to herein as Embodiment 2, an extended SIB1 (which may be referred to as e-SIB1) is formed by adding to the legacy SIB1 an IE specific to bandwidth-limited UEs; this IE is used by the bandwidth-limited UE for initial access, e.g., to configure a specific initial uplink BWP for the bandwidth-limited UE. The initial access process, illustrated in FIG. 5, may proceed as follows. The process, for the full-bandwidth UE, is the same as that illustrated and described for Embodiment 1. At 405, both the full-bandwidth UE and the bandwidth-limited UE acquire an SSB. From the MIB, the UEs read the CORESET #0 configuration. The full-bandwidth UE monitors CORESET #0 for a DCI with CRC scrambled by SI-RNTI, and the bandwidth-limited UE monitors CORESET #0 for a DCI with CRC scrambled by SI-BL-RNTI. If CORESET #0 is configured with a bandwidth that is not within the bandwidth capability of the bandwidth-limited UE, then the bandwidth-limited UE is configured with (e.g., the bandwidth-limited UE selects, or configures itself with), and monitors, the portion 450 of the CORESET #0 within the bandwidth capability of the bandwidth-limited UE, i.e., the bandwidth-limited UE treats the PDCCH as punctured. In this case, the bandwidth-limited UE receives the DCI through a punctured PDCCH, i.e., it does not receive all of the bits of the DCI; it receives only those bits carried in resource elements (REs) 455 that are within its bandwidth capability. In some embodiments, the configuring of the bandwidth-limited UE with the portion 450 of the CORESET #0 within the bandwidth capability of the bandwidth-limited UE may include implicitly configuring the bandwidth-limited UE with the portion of the initial CORESET, e.g., if the bandwidth-limited UE always uses the lowest index resource blocks (RBs). The bandwidth-limited UE then acquires the e-SIB1 and the legacy SIB1 through scheduled PDSCH. If CORESET #0 is configured with a bandwidth that is within the bandwidth capability of the bandwidth-limited UE, then the bandwidth-limited UE receives the DCI through an unpunctured PDCCH, i.e., it receives all of the bits of the DCI.

The e-SIB1 may also be used by the network to specify an initial uplink BWP and a downlink BWP (each of which may be the same as, or different from, the uplink or downlink initial BWP used by the full-bandwidth UE) to be used by the bandwidth-limited UE. In operation, the bandwidth-limited UE may determine, from the e-SIB1, an uplink BWP and a downlink BWP, and it may then transmit in the uplink BWP, and receive network communications in the downlink BWP.

In Embodiment 2, some performance degradation may be present, because of the puncturing of the PDCCH and the PDSCH. Embodiment 2 may carry a number of advantages, however, including (i) that it supports all CORESET #0 options for Rel-15 NR, (ii) that legacy SIB1 IEs may also be read by BL-UEs, such that no duplication of IEs is needed, and that (iii) no duplication of PDCCH and PDSCH is needed.

Figure 6:
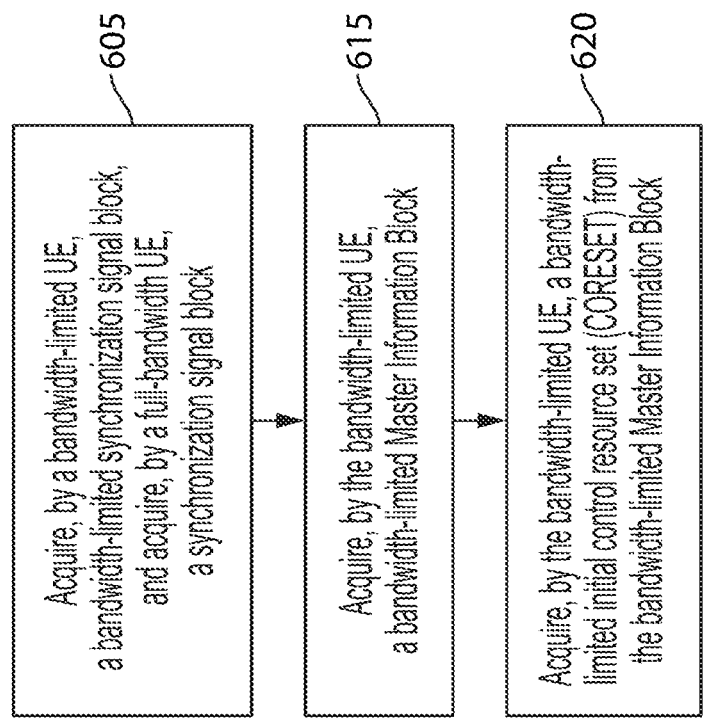
FIG. 6 is a flowchart, according to an embodiment of the present disclosure.

In another embodiment, referred to herein as Embodiment 3, a separate SSB, a separate CORESET #0, and a separate RRC SIB1 are used by the bandwidth-limited UE for initial access in frequency range 2 (FR2). In FR2, the legacy SSB bandwidth may be as large as 57.6 MHz (with SCS of 240 kHz and 20 RBs). However, the bandwidth-limited UE may only support a maximum bandwidth of 50 MHz. In this case, in Embodiment 3, dedicated BL-SSB, BL-CORESET #0, and BL-RRC SIB1 may be used by the bandwidth-limited UE for the initial access process. FIG. 6 shows a portion of this method.

The following procedure may then be used by a bandwidth-limited UE for the initial access process. First, at 605, a full-bandwidth UE may acquire a Synchronization Signal Block (SSB) and the bandwidth-limited UE acquires a dedicated SSB, referred to herein as a bandwidth-limited SSB (BL-SSB) which is different from the SSB and which is located in a pre-configured frequency and time position of the synchronization raster (different than the legacy SSB position). The bandwidth-limited UE is aware of the BL-SSB location before the initial access process begins.

Next, the bandwidth-limited UE acquires, at 615, a dedicated MIB, referred to herein as a bandwidth-limited MIB (BL-MIB) from the dedicated PBCH, referred to herein as the bandwidth-limited PBCH (BL-PBCH) from the BL-SSB. The bandwidth-limited UE then acquires, at 620, the BL-CORESET #0 from the BL-MIB, and monitors BL-CORESET #0 for DCI with CRC scrambled by SI-BL-RNTI. Finally, the bandwidth-limited UE acquires BL-SIB1 through scheduled PDSCH. This procedure may also be used in frequency range 1 (FR1) when the bandwidth capability of the bandwidth-limited UE is less than the bandwidth of the legacy SSB.

In some embodiments, methods described herein may be performed by a processing circuit of the UE, or by a processing circuit of the network or both. For example, the processing circuit of the UE may send (via a radio in the UE), to a network, message 1 and message 3 of the initial access process. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, when a second number is "within Y %" of a first number, it means that the second number is at least (1−Y/100) times the first number and the second number is at most (1+Y/100) times the first number. As used herein, the term "or" should be interpreted as "and/or", such that, for example, "A or B" means any one of "A" or "B" or "A and B".

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a system and method for accommodating reduced capability user equipment in a mobile network have been specifically described and illustrated herein, many modifications and variations will be apparent to those skilled in the art. Accordingly, it is to be understood that a system and method for accommodating reduced capability user equipment in a mobile network constructed according to principles of this disclosure may be embodied other than as specifically described herein. The invention is also defined in the following claims, and equivalents thereof.

What is claimed is:

1. A method, comprising:
   acquiring, by a bandwidth-limited user equipment (UE) having a bandwidth capability, a Synchronization Signal Block (SSB) including a Master Information Block (MIB);
   determining a set of identifying bits, wherein the set of identifying bits is contained in the MIB or in an extended MIB (e-MIB);

identifying a first initial control resource set (CORESET), based on the set of identifying bits;

monitoring, by the bandwidth-limited UE, the first initial CORESET;

receiving, by the bandwidth-limited UE, an initial bandwidth part (BWP) configuration; and switching, by the bandwidth-limited UE, to the initial BWP configuration, wherein:
the bandwidth-limited UE is configured with a UE-specific dedicated BWP, and
the UE-specific dedicated BWP is different from the initial BWP configuration.

2. The method of claim 1, wherein the identifying of the first initial CORESET comprises:

detecting, by the bandwidth-limited UE, a reserved bit in the MIB; and identifying the first initial CORESET from among a set of bandwidth-limited initial CORESETs, based on the set of identifying bits, wherein the MIB contains the set of identifying bits.

3. The method of claim 1, wherein the determining of the set of identifying bits comprises:

detecting, by the bandwidth-limited UE, a reserved bit in the MIB; and acquiring, by the bandwidth-limited UE, an extended MIB (e-MIB) containing the set of identifying bits.

4. The method of claim 1, wherein the identifying of the first initial CORESET comprises:

identifying a legacy initial CORESET from a full-bandwidth set of initial CORESETs;

determining that the bandwidth of the legacy initial CORESET is within the bandwidth capability of the bandwidth-limited UE; and identifying the first initial CORESET to be the legacy initial CORESET.

5. The method of claim 1, wherein the identifying of the first initial CORESET comprises:

identifying a legacy initial CORESET from a full-bandwidth set of initial CORESETs;

determining that the bandwidth of the legacy initial CORESET is not within the bandwidth capability of the bandwidth-limited UE; and identifying the first initial CORESET from a set of bandwidth-limited initial CORESETs, based on set of identifying bits.

6. The method of claim 1, wherein the monitoring of the first initial CORESET comprises monitoring the first initial CORESET for a Downlink Control Information (DCI).

7. The method of claim 6, wherein the DCI comprises a cyclic redundancy code (CRC) scrambled with a bandwidth-limited System Information Radio Network Temporary Identifier (SI-BL-RNTI).

8. The method of claim 6, further comprising acquiring a bandwidth-limited System Information Block #1 (SIB1) through a scheduled Physical Downlink Shared Channel (PDSCH).

9. The method of claim 1, further comprising acquiring, by a full-bandwidth (UE), the Synchronization Signal Block (SSB), determining the set of identifying bits;

identifying a second initial control resource set (CORESET), based on the set of identifying bits; and monitoring, by the full-bandwidth UE, the second initial CORESET.

10. A method, comprising:

acquiring, by a bandwidth-limited user equipment (UE) having a bandwidth capability, a synchronization signal block including a master information block (MIB);

determining a set of identifying bits, wherein the set of identifying bits is contained in the MIB or in an extended MIB (e-MIB);

identifying an initial control resource set (CORESET), based on the set of identifying bits, the initial CORESET occupying a bandwidth greater than the bandwidth capability of the bandwidth-limited UE;

selecting, by the bandwidth-limited UE, a portion of the initial CORESET, the portion of the initial CORESET occupying a bandwidth within the bandwidth capability of the bandwidth-limited UE;

receiving, by the bandwidth-limited UE, an initial bandwidth part (BWP) configuration; and switching, by the bandwidth-limited UE, to the initial BWP configuration, wherein:
the bandwidth-limited UE is configured with a UE-specific dedicated BWP, and
the UE-specific dedicated BWP is different from the initial BWP configuration.

11. The method of claim 10, further comprising acquiring a first Downlink Control Information (DCI) through a punctured Physical Downlink Control Channel (PDCCH).

12. The method of claim 10, further comprising acquiring a System Information Block #1 (SIB1) and an extended System Information Block #1 (e-SIB1) through a scheduled Physical Downlink Shared Channel (PDSCH), wherein the PDSCH occupies a bandwidth greater than the bandwidth capability of the bandwidth-limited UE, and the acquiring of the SIB1 and of the e-SIB1 comprises acquiring the SIB1 and of the e-SIB1 through a punctured PDSCH.

13. The method of claim 12, further comprising:

determining, from the e-SIB1, by the bandwidth-limited UE:
an uplink bandwidth part (BWP), and
a downlink BWP;

transmitting, by the bandwidth-limited UE, in the uplink BWP; and receiving, by the bandwidth-limited UE, a network communication in the downlink BWP.

14. The method of claim 10, wherein the selecting, by the bandwidth-limited UE of a portion of the initial CORESET comprises implicitly selecting, by the bandwidth-limited UE, a portion of the initial CORESET.

15. A method, comprising acquiring, by a bandwidth-limited user equipment (UE), a bandwidth-limited Synchronization Signal Block (BL-SSB), wherein the BL-SSB is located in a pre-configured frequency and time position of a synchronization raster, and wherein the bandwidth-limited UE is aware of the location of the BL-SSB prior to the commencement of the initial access process.

16. The method of claim 15, further comprising acquiring, by a full-bandwidth user equipment (UE), a Synchronization Signal Block (SSB) different from the BL-SSB, wherein the SSB is received in a first set of resource elements (REs) and the BL-SSB is received in a second set of resource elements, different from the first set of resource elements (REs).

17. The method of claim 15, further comprising:

acquiring, by the bandwidth-limited UE, a bandwidth-limited Master Information Block (BL-MIB) from a bandwidth-limited physical broadcast channel (BL-PBCH) from the BL-SSB; and acquiring, by the bandwidth-limited UE, a bandwidth-limited initial control resource set (CORESET) from the BL-MIB.

18. The method of claim 17, further comprising acquiring, by the bandwidth-limited UE, a Downlink Control Information (DCI), the acquiring of the DCI comprising monitoring the bandwidth-limited initial CORESET for a DCI comprising a cyclic redundancy code (CRC) scrambled with a bandwidth-limited System Information Radio Network Temporary Identifier (SI-BL-RNTI).

19. The method of claim 17, further comprising acquiring, by the bandwidth-limited UE, a bandwidth-limited System Information Block #1 (SIB1) through a scheduled Physical Downlink Shared Channel (PDSCH).

20. The method of claim 16, wherein the acquiring, by the bandwidth-limited user equipment (UE), of the BL-SSB comprises acquiring the BL-SSB in Frequency Range 1 (FR1).

21. The method of claim 16, wherein the acquiring, by the bandwidth-limited user equipment (UE), of the BL-SSB comprises acquiring the BL-SSB in Frequency Range 2 (FR2).

\* \* \* \* \*